UNITED STATES PATENT OFFICE.

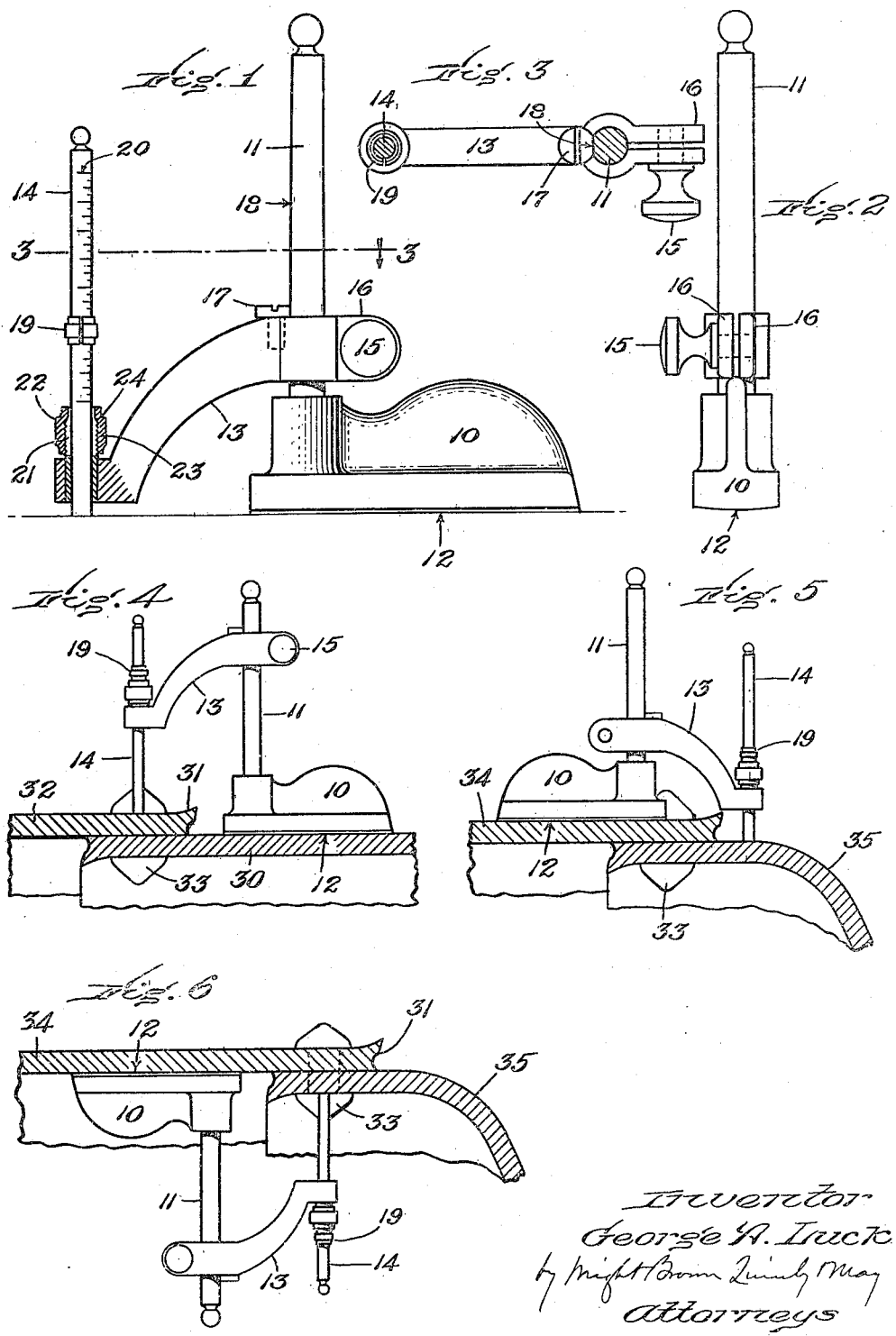

GEORGE A. LUCK, OF CAMBRIDGE, MASSACHUSETTS.

CALIPERS.

1,225,835.

Specification of Letters Patent.

Patented May 15, 1917.

Application filed July 19, 1915. Serial No. 40,633.

*To all whom it may concern:*

Be it known that I, GEORGE A. LUCK, a citizen of the United States, and resident of Cambridge, in the county of Middlesex and State of Massachusetts, have invented certain new and useful Improvements in Calipers, of which the following is a specification.

The object of the present invention is to provide a caliper capable of measuring the thickness of an element such as a boiler plate, to which access is prevented as to one of its surfaces by another element attached thereto.

Inspectors and repairers of boilers are required to measure the thickness of the plates and heads which form the shells of boilers. The shell-forming members of boilers, being lapped and riveted, are made tight by calking the seams. The calking operation upsets and thickens the edge of the member against which the calking tool is driven, and it is impossible to measure the thickness of a calked member by applying the measuring instrument to its distorted edge. In order to obtain the utmost accuracy of measurement in such cases, the measurement should be taken approximately in the line of the rivets, for in such line the members are held in contact with each other. But since only one surface of the member which is to be measured is accessible, and since two surfaces are required, the measurement must be taken from one surface of one member to one surface of the contiguous member, and these surfaces must be outside the range of distortion as caused by calking.

The present invention provides a measuring instrument which fulfils the requirements last described, and which is adapted to serve equally well upon the interior and exterior of a boiler shell. The said instrument includes a stand and a relatively movable bar which has a scale marked thereon and a friction collar adapted to slide thereon to coöperate with said scale to indicate the measurement. The bar is set out laterally from the stand by an arm which enables the bar to reach across the calked portions and touch the surfaces of the boiler shell which have not been upset.

Of the accompanying drawings:—

Figure 1 represents a side elevation, partly in section, of a caliper embodying this invention.

Fig. 2 represents an end view thereof.

Fig. 3 represents a horizontal section in the plane indicated by line 3—3 of Fig. 1.

Fig. 4 represents a caliper in elevation as applied to the exterior of a boiler shell to measure the outer plate when the inner plate furnishes a suitable foundation for the caliper.

Fig. 5 represents an elevation of the caliper as applied to the exterior of a boiler shell to measure the outer member when the inner member does not furnish a suitable foundation for the caliper.

Fig. 6 represents an elevation of the caliper as applied to the interior of a boiler shell to measure the inner member when the latter does not furnish a suitable foundation for the caliper.

The same reference characters indicate the same parts wherever they occur.

The caliper comprises a stand including a base member 10 and a post 11. The post is arranged to extend at right angles to the base surface 12 of the base member. The base surface 12, as shown, is cylindrical, the radius of curvature being approximately 18 inches, so that the surface 12 may have the desired single line contact with the internal surface of a shell of three feet or more in diameter. The curvature of the surface 12 is necessary only when the base member is applied to an internal cylindrical surface, but it will serve equally as well as a flat base surface when the device is applied to an external cylindrical surface. The axis of the post 11 intersects the axis of curvature of the surface 12.

The post 11 carries an arm 13 which projects laterally beyond the base of the stand to carry a measuring bar 14. The arm 13 is adjustable relatively to the post, and for this purpose it is split as shown by Fig. 3 and provided with a thumb-screw 15 whereby the two clamping portions 16, 16 may be drawn together to clamp the post. For the purposes of measuring boiler plates or other plates of cylindrical form, it is desirable to maintain the arm 13 in the angular position shown, and accordingly the arm is provided with a screw 17 the head of which is flattened to coact with a flat surface 18 formed upon the post. For other purposes the screw may be removed to enable the arm to have angular movement as well as movement lengthwise of the post.

The measuring bar 14 is arranged to slide in the arm 13, its direction of movement being at right angles to the plane of the base. A split collar 19 is carried by the bar 14 and is adapted to slide thereon to abut the arm 13. For convenience in indicating a measurement the bar 14 is provided with a scale of marks 20, and the collar 19 is adapted to coöperate with such marks to indicate and preserve the reading. The arm 13 is provided with a clamping device engaging the bar 14, whose function is to hold the bar against movement relatively to the arm. This clamping device comprises a split sleeve 21, in the nature of a chuck, and a nut 22, the split sleeve and nut having coöperative connecting screw-threads 23 and having coöperative tapering portions at 24 whereby the sleeve 23 is contracted as the tapering portion of the nut is brought to bear against the tapering portion of the sleeve.

It will be observed that the measuring bar 14 is arranged a substantial distance away from the base of the stand, so that it can touch a boiler plate in the line of the rivets while the arm 13 reaches across the upset portion of the plate.

I will now describe how the caliper may be used as shown by Figs. 4 and 6, the description of use being in the form of directions. Slide the collar 19 along the bar 14 until the upper end of the collar registers with a predetermined mark of the scale, for example the mark nearest the upper end of the bar. Loosen the clamping device 22, 23, and slide the bar therethrough as far as the collar 19 will permit, taking care to keep the upper end of the collar on the scale mark previously determined. Screw the nut 22 downwardly to clamp the bar relatively to the arm. Loosen the thumb-screw 15 and slide the arm 13 upwardly on the post 11 until the lower end of the bar 14 is above the plane of the base surface 12 of the stand. Now place the member 10 upon a substantially flat surface, or, if one is not available, place it upon the cylindrical surface of the boiler shell, keeping the stand in such position that the axis of curvature of its surface 12 will be parallel to the axis of the boiler shell. Slide the arm downwardly along the post 11 until the measuring bar 14 touches the element upon which the stand has been placed, at the same time keeping the measuring bar and arm 13 in the relation previously determined. Fasten the arm 13 by tightening the screw 15. The lower end of the bar 14 is thus set in the plane of the base surface 12, and the adjustment of the arm 13 is thus determined. Loosen the clamping device 21, 22. Raise the bar 14 relatively to the arm 13 and slide the collar 19 downwardly along the bar a distance substantially greater than the measurement which is to be taken.

The device is now ready to be applied as shown by Fig. 4 or as shown by Fig. 6. Referring first to Fig. 4, place the base member 10 upon the inner member 30 of the boiler shell, abutting or close to the calked edge 31 of the outer member 32. Arrange the base member so that the axis of curvature of its base surface 12 will be parallel to the axis of the boiler shell. The arm 13 is thus caused to reach across the calked edge 31 of the outer member 32 so that the measuring bar 14 may touch the member 32 between the rivets 33 and in the line or substantially in the line of the rivets where the members 30 and 32 are held in contact with each other and where the member 32 is not affected by the upsetting of the edge 31. Now depress the measuring bar 14 until its lower end touches the member 32, the collar 19 being thus set so that the distance between its upper end and the predetermined mark in the scale is equal to the thickness of the member 32 in the line of the rivets. Nothing more remains to be done excepting to read the measurement indicated by the upper end of the collar 19 in conjunction with the scale of marks 20. For this purpose the bar 14 may be withdrawn from the arm if the indication can be read with greater facility by doing so.

If the inner member of the boiler shell is of a shape which will not afford a suitable foundation for the base member of the device, the thickness of the outer member may be measured by applying the device as shown by Fig. 5, the base member 10 in this case being placed against the outer member approximately in the line of rivets 33 and arranged so that the arm 13 will reach across the upset edge portion 31 to enable the measuring bar 14 to touch the inner member close to said edge portion. In order to apply the device in this manner the preliminary adjustments are performed in a different manner from that described in connection with Fig. 4. The directions for use according to Fig. 5 are as follows. Slide the collar 19 toward the lower end of the bar 14 until the lower end of the collar registers with the lowest scale mark 20. Slide the bar 14 downwardly as far as the collar 19 will permit, keeping the collar in register with the lowest mark of the scale. Clamp the bar 14 by tightening the nut 22. Set the base member 10 upon a flat surface or any other surface which will afford a straight line contact for the surface 12 and bar 14, and bring the bar into contact with such surface by moving the arm 13 downwardly upon the post 11. When the bar 14 has thus been brought into the plane of the surface 12, tighten the thumb-screw 15 to fasten the arm 13 to the post. Loosen the nut 22, and then place the base member 10 upon the outer member 34 as shown by Fig. 5. Depress the bar 14 until it touches the inner member 35. The measurement is now indicated on the bar 14, and the latter can be withdrawn from the arm 13, and the distance between the lowest mark 20 of the scale and the lower end of the collar 19 will be equal to the thickness of the member 34.

In order to measure the thickness of the inner member 35, the device would be applied to the interior of the boiler shell as shown by Fig. 6, and the method of procedure would be the same as that explained in connection with Fig. 4.

From the foregoing it is obvious that the thickness of the outer member 32 in Fig. 4 could be measured by applying the device as shown by Fig. 5, and that the thickness of the inner member 30 could be measured by applying the device as shown by Fig. 6. It is the cylindrical curvature of the surface 12 which enables the device to measure accurately when the base member is applied to an internal cylindric surface. Although the device is designed primarily for measuring boiler plates or other lapped plates of a cylindrical shell, it is obvious that it would serve equally as well for measuring the thickness of flat plates, and that the method of procedure in the latter case would be the same as when the plates are cylindric.

From the foregoing it may be readily understood that the collar 19 may be omitted, in which case the measurement would be indicated on the bar 14 by the upper or lower end of the sleeve 21, according to whether the device were applied as shown by Figs. 4 and 6 or as shown by Fig. 5.

I claim:

A caliper comprising a stand having a cylindrical base surface, an arm carried by said stand and projecting laterally beyond the base of said stand, a bar arranged to slide in said arm in a line intersecting the axis of curvature of said base surface, and a friction device carried by said bar and adapted to slide thereon and abut said arm, said bar being arranged a substantial distance away from said base.

In testimony whereof I have affixed my signature.

GEORGE A. LUCK.

Copies of this patent may be obtained for five cents each, by addressing the "Commissioner of Patents, Washington, D. C."